2,934,512
COATING COMPOSITION OF METHYL METHACRYLATE POLYMER, COPPER BRONZE PIGMENT, AND TRANSPARENT COLORED PIGMENT AND ARTICLE COATED THEREWITH

Henry W. Godshalk, Swarthmore, Pa., assignor to E. I. du Pont de Nemours and Company, Wilmington, Del., a corporation of Delaware No Drawing. Application September 20, 1954
Serial No. 457,300

16 Claims. (Cl. 260—41)

This invention relates to liquid coating compositions, and more particularly to such compositions containing polymers of methyl methacrylate and copper bronze flake pigment, and articles coated therewith.

By the term "polymer of methyl methacrylate" and related terms, as used herein, are meant homopolymers of methyl methacrylate, copolymers of methyl methacrylate and other materials copolymerizable therewith containing a major proportion of methyl methacrylate, or mixtures of such homopolymers and/or copolymers.

By the term "methyl methacrylate lacquer," as used herein for the sake of brevity, is meant a liquid coating composition containing a polymer of methyl methacrylate as the principal film-forming material. It may also contain conventional pigments and such conventional modifiers as plasticizers, inhibitors, dispersing agents, flow control agents and the like. When reference is made to coatings or films of methyl methacrylate, lacquer, the term signifies dry coatings obtained by applying such liquid coating compositions to a suitable substrate and permitting or causing the coating to dry.

By the term "copper bronze flake pigment" and related terms, as used herein, are meant pale gold to dark copper colored alloys of copper with, for instance, zinc and/or tin in the form of tiny reflective flakes or platelets. The term specifically excludes the substantially pure aluminum flake pigments and so-called aluminum bronze pigments, which are silver-colored. Copper bronze flake pigments are commercially available in many depths of color and in many particle size grades, such as extra fine and fine lining powders, somewhat coarser brilliant powders, and still coarser extra brilliant powders.

The use of copper bronze flake pigments in coating compositions of the general character of nitrocellulose lacquers, drying oil varnishes and alkyd resin enamels has been impaired by the problems of gelation of the liquid compositions and poor durability of the dry coatings. Gelation has been attributed to reaction between the bronze flakes and the organic film-forming material during short- or long-term storage. Poor durability has been attributed to early tarnishing and/or dulling of the bronze flakes due to weathering, possibly accompanied by reaction between the flakes and the organic film-forming material or the decomposition products thereof. Many special techniques have been resorted to in attempting to overcome these deficiencies, including chemical modification of the bronze flake and/or the organic film-forming material, and the addition of inhibitors. A popular technique, which avoids the gelation problem but does not materially improve durability, involves mixing the bronze powder in the liquid constituents just before the composition is to be applied.

The principal object of this invention is to provide copper bronze powder-containing coating compositions which do not gel during storage.

Another object is to provide copper bronze powder-containing coating compositions which resist early tarnishing and/or dulling during prolonged outdoor exposure.

A further object is to provide non-gelling copper bronze powder-containing coating compositions which have improved crazing resistance.

These objects are accomplished by providing liquid coating compositions comprising a polymer of methyl methacrylate, solvent therefor, and a relatively transparent colored pigment and 0.5–35% of copper bronze flake pigment, with or without the addition of 1–50% of organophilic ammonium cation-modified clay which has at least one alkyl substituent containing at least 10 carbon atoms in a straight chain, the percentages of said pigment and clay being by weight based on the total non-volatile components.

In addition to these ammonium cation-modified clays, various other onium cation-modified clays are described in United States Patent 2,531,427, which issued November 28, 1950, to Ernst A. Hauser. Examples of such materials are, for instance, montmorillonites, bentonites, zeolites, attapulgites and the like, originally in the form of acidic clays or inorganic salts thereof, which have been converted into onium salts by reaction with an onium compound in which the onium radical is selected from the class consisting of ammonium, phosphonium, oxonium, sulfonium, selenonium, stannonium, arsonium, stibonium, telluronium and iodonium, and has at least one alkyl stubstituent containing at least 10 carbon atoms in a straight chain, e.g., onium radicals such as decyl ammonium, linoleyl (i.e., octadecadienyl) ammonium, lauryl (i.e., dodecyl) triphenyl phosphonium, didoceyl ethyl sulfonium, decyl triphenyl arsonium, decyl triphenyl stibonium, didodecyl-gamma pyronium which acts like oxonium, and didodecyl ethyl telluronium. These other onium cation-modified clays may be utilized in this invention in place of the ammonium cation-modified clays, atlhough the latter are preferred.

The compositions of this invention are "polychromatic" or "metallic" products, in which relatively transparent colored pigments, such as reds, yellows, greens and blues, provide the basic hue and the bronze flakes provide colored mirrors that reflect various elements of the basic hue to produce the polychromatic effect.

The polychromatic products provide a particularly new category of color effects in coatings. Formerly, the available polychromatic effects have been derived from aluminum flake pigments, with attendant limitation to the inherent silvery effect of the tiny aluminum mirrors and the grayish deadening of the brightness of the color due to the presence of extremely fine aluminum particles. The polychromatic products of this invention based on copper bronze flake pigments have been found to eliminate these problems and provide a new series of bright, lively colored, coating compositions for various products, such as sporty automobiles.

The following examples are illustrative of the principles and practice of this invention although it is not limited thereto. Unless otherwise indicated, the parts and percentages are by weight.

*Example 1*

A polychromatic maroon colored bronze lacquer containing a relatively transparent colored pigment (i.e., the maroon) was prepared by mixing the following ingredients to form a uniform composition:

| Maroon bronze lacquer: | Parts by weight |
|---|---|
| Bronze pigment dispersion | 8.5 |
| Maroon pigment dispersion | 245.9 |
| Modified clay dispersion | 89.0 |
| Polymethyl methacrylate solution | 21.8 |
| Benzyl butyl phthalate | 34.8 |
| | 400.0 |

The dispersions had the following compositions:

Bronze pigment dispersion: Parts by weight
Copper bronze flake pigment—United States
  States Bronze Powder Works #6616 Extra
  Brilliant Fine _____ 13.5
Polymethyl methacrylate solution _____ 67.6
Toluene _____ 18.9
                                       ─────
                                       100.0

This dispersion was prepared by stirring the pigment with the other ingredients.

Maroon pigment dispersion: Parts by weight
Maroon pigment—E. I. du Pont de Nemours
  & Co. RT-608-D Maroon Gold _____ 8.8
Polymethyl methacrylate solution _____ 55.4
Xylene _____ 35.8
                                       ─────
                                       100.0

Modified clay dispersion:
Dimethyl dioctadecyl ammonium bentonite __ 6.7
Polymethyl methacrylate solution _____ 55.8
Xylene _____ 37.5
                                       ─────
                                       100.0

The maroon and clay dispersions were prepared by grinding the ingredients in conventional paint grinding equipment until smooth uniform dispersions were produced.

The polymethyl methacrylate solution used in the maroon bronze lacquer and in the dispersions contained therein had the following composition:

Polymethyl methacrylate solution: Parts by weight
Homopolymer of methyl methacrylate (mo-
  lecular weight about 83,000) _____ 40
Toluene _____ 42
Acetone _____ 18
                                       ─────
                                       100

Expressed in simplified form, the maroon bronze lacquer of this example had the following composition:

|   | Parts by Weight | Percent by Weight |
|---|---|---|
| Copper bronze flake pigment | 1.2 | 0.3 |
| Maroon pigment | 21.8 | 5.4 |
| Modified clay | 6.0 | 1.5 |
| Polymer of methyl methacrylate | 85.3 | 21.3 |
| Solvents | 250.9 | 62.8 |
| Benzyl butyl phthalate | 34.8 | 8.7 |
|   | 400.0 | 100.0 |

In this composition the copper bronze flake pigment was present in the amount of 0.8% by weight of the total non-volatile components, i.e., all of the components except the solvents.

A portion of the coating composition of this example was thinned to spraying viscosity and was sprayed on a primed 4″ x 12″ steel panel in sufficient amount to produce a dry coating about 2 mils thick. The coating was dried for 30 minutes at 180° F. to speed up the drying and produce a hard adherent coating. Drying at room temperature would have required 16–24 hours.

The resulting coating was characterized by unique clarity and brightness. It appeared to be free of the faintly visible dirtiness or grayness which is present in analogous coatings containing aluminum flake pigment in place of the copper bronze flake pigment. Depending upon the viewing angle, the color varied from maroon to maroon-gold.

In outdoor exposure tests in Florida, the resulting coating was found to resist the tarnishing and dulling which are characteristic of prior art bronze flake-containing coatings and to remain glossy and bright in color.

Another portion of the liquid coating composition of this invention was stored in a closed can and was periodically examined for viscosity stability and gelation. In contrast to prior art bronze flake-containing coating compositions, which gel or increase in viscosity to an unusable condition in a matter of hours or a few days when special treatments are absent, the product of this example had not gelled after 3 months, and the fact that the viscosity had not changed materially indicated that the product would remain in usable condition indefinitely.

*Example 2*

A polychromatic blue colored bronze lacquer of this invention containing a relatively transparent colored pigment (i.e., the blue) was prepared by mixing the following ingredients in the manner described in Example 1:

Blue bronze lacquer: Parts by weight
Bronze pigment dispersion _____ 74
Blue pigment dispersion _____ 50
Polymethyl methacrylate solution _____ 127
Benzyl butyl phthalate _____ 29
                                       ─────
                                       280

The dispersions had the following compositions:

Bronze pigment dispersion: Parts by weight
Copper bronze flake pigment—United States
  Bronze Power Works #6615 Richgold
  Extra Fine _____ 13.5
Polymethyl methacrylate solution _____ 67.6
Toluene _____ 18.9
                                       ─────
                                       100.0

Blue pigment dispersion:
Phthalocyanine blue pigment _____ 4.2
Polymethyl methacrylate solution _____ 74.0
Benzyl butyl phthalate _____ 12.0
Xylene _____ 9.8
                                       ─────
                                       100.0

The polymethyl methacrylate solution used in the blue bronze lacquer and in the dispersions contained therein had the following composition:

Polymethyl methacrylate solution: Parts by weight
Homopolymer of methyl methacrylate (molec-
  ular weight about 85,000) _____ 40
Toluene _____ 42
Acetone _____ 18
                                       ─────
                                       100

Expressed in simplified form, the blue bronze lacquer of this example had the following composition:

|   | Parts by Weight | Percent by Weight |
|---|---|---|
| Copper bronze flake pigment | 10.0 | 3.6 |
| Blue pigment | 2.1 | .8 |
| Polymer of methyl methacrylate | 85.6 | 30.5 |
| Solvents | 147.3 | 52.6 |
| Benzyl butyl phthalate | 35.0 | 12.5 |
|   | 280.0 | 100.0 |

In this composition, the copper bronze flake pigment was present in the amount of 7.4% by weight of the total non-volatile components.

This coating composition was tested for non-gelation during storage and for outdoor durability in the manner described in Example 1, and showed substantially the same improvements over analogous prior art compositions.

The coating was characterized by unique clarity and brightness. Depending on the viewing angle, the color varied from blue to bright green, a result which is attributable to the fact that the blue pigment was somewhat transparent and, as the viewing angle varied, more or less of the yellowish light reflected from the bronze flakes blended with the color from the blue pigment.

The bronze pigments may be incorporated in the products of this invention by first mixing them with part of the liquid components and adding the resulting mixture to the other components or by adding them directly to an otherwise finished composition.

It is to be understood that the particular pigments, solvents, diluents and plasticizer used in the examples are merely illustrative of a wide variety of such materials which may be used and which are well known to those skilled in the organic coating art.

A polymer of methyl methacrylate may be prepared by polymerizing methyl methacrylate monomer, with or without another monomer copolymerizable therewith, in bulk, in solution or in granular form to produce polymers having a wide range of molecular weight. Polymers having a molecular weight of about 55,000 to 105,000 are readily soluble in a wide variety of common and relatively inexpensive solvents and are preferred in the practice of this invention because they are sprayable at high solids without webbing. Coating compositions containing such polymers are disclosed and claimed in the copending application of Crissey and Lowell, Ser. No. 402,498, filed January 6, 1954, now abandoned.

The molecular weight values, referred to herein, are on the basis of weight average molecular weight and are calculated from the equation $$M = 1.47 \times 10^6 \ (N_r - 1 - \ln N_r)^{0.65}$$

in which M is the molecular weight and $N_r$ is the value of the fraction (A) Efflux time of polymer solution
(B) Efflux time of solvent used in polymer solution The efflux times are measured in accordance with the procedure of ASTM-D-445-46T Method B using, as the "oil" mentioned in said procedure, (A) a solution of 0.25 gram of the polymer of methyl methacrylate being tested in 50 cc. of ethylene dichloride, and (B) a sample of the ethylene dichloride used in making said solution, respectively. The determinations are run at 25° C. in a modified Ostwald viscosimeter, series 50.

By this method the preferred polymers of methyl methacrylate employed in this invention have $N_r$ values between 1.117 and 1.196, which correspond to calculated molecular weight values of 55,000 and 105,000, respectively.

A variety of polymers of methyl methacrylate are disclosed in the foregoing examples. The homopolymers are especially useful. Suitable copolymers include copolymers of methyl methacrylate with a minor proportion, e.g., 2–25%, of another material copolymerizable therewith, for instance, acrylic and methacrylic acids, the $C_1$–$C_4$ alkyl esters of acrylic acid, the $C_2$–$C_4$ alkyl esters of methacrylic acid, vinyl acetate, acrylonitrile, and styrene. A particularly useful copolymer contains about 98% of methyl methacrylate and 2% of methacrylic acid.

The specific polymers employed in the examples may be replaced partly or wholly by similar amounts of any of the polymers of methyl methacrylate described immediately above.

Examples of useful colored pigments are, for instance, the relatively transparent iron blues, organic reds and maroons, metallic oxides, and chromates.

Examples of useful volatile solvents and diluents are, for instance, aliphatic, cycloaliphatic and aromatic hydrocarbons, esters, ethers, ketones and alcohols.

Many well-known plasticizers for polymers of methyl methacrylate may be employed in the compositions of this invention in place of all or part of the benzyl butyl phthalate used in the examples. However, the particular plasticizer used affects the physical properties of the resulting coating, including cracking, crazing, flexibility and durability. The preferred plasticizer is benzyl butyl phthalate, because it imparts the best overall balance of properties, and especially the crack-resistance. Other plasticizers which will produce films having especially desirable properties are dibutyl phthalate, triphenyl phosphate, 2-ethyl hexyl benzyl phthalate and dicyclohexyl phthalate. Other well-known plasticizers for polymers of methyl methacrylate which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate and di(methylcyclohexyl) phthalate. Plasticizers are normally employed in amounts of about 10–50% by weight based on the weight of the polymer of methyl methacrylate.

Other well-known modifying agents for organic coating compositions may be incorporated to alter the manufacturing, storage, application or service properties of the compositions of this invention, such as soya lecithin, silicone fluids, triethanolamine, fatty oil acids and glyceride oil derivatives.

A preferred modifying agent for inhibiting the settling of pigment to the bottom of the container in which the liquid compositions of this invention are stored and for increasing craze resistance, is ammonium cation-modified clay such as bentonite or montmorillonite, a further preferred onium cation-modified clay is quaternary or tetra-substituted ammonium modified clay, and a specifically preferred onium cation-modified clay is the dimethyldioctadecyl ammonium bentonite used in Example 1.

Although the ammonium cation-modified clays are preferred for use in this invention, the other onium cation-modified clays discussed above may be substituted therefor in Exxample 1 or in other coating compositions within the scope of this invention.

Coating compositions containing a polymer of methyl methacrylate, solvent and 1–50% of organophilic cation-modified clay, based on the total weight of the non-volatile components, and having at least one alkyl substituent containing at least 10 carbon atoms in a straight chain, are disclosed and claimed broadly in the copending application of Laverne W. Crissey, Serial No. 457,301, filed of even date herewith, now Patent No. 2,892,804.

The products of this invention may be applied to a wide variety of substrates, such as wood, glass and metal, by any well-known application method, such as spraying, dipping or brushing. Although the coatings may be air-dried, the drying period can be minimized by baking. The resulting coatings may be rubbed or polished, if desired, to impart further smoothness and/or higher apparent gloss.

The products are useful as ready-mixed non-gelling lacquers for coating articles which are subjected to the weather, and which are required to protect the substrate and to retain a pleasing and decorative appearance for long periods. For these reasons the products are particularly useful as top coat finishes for application to suitably primed automobile bodies.

It is apparent that many widely different embodiments of this invention may be made without departing from the spirit and scope thereof, and, therefore, it is not intended to be limited except in accordance with the appended claims.

I claim:
1. A non-gelling liquid coating composition which on drying yields a durable non-tarnishing film, comprising a polymer of methyl methacrylate having a molecular weight of 55,000–105,000, solvent therefor, transparent colored pigment, and 0.5–35% of copper bronze flake pigment, based on the total weight of the non-volatile components.

2. The coating composition of claim 1, in which said copper bronze flake pigment comprises 0.75–15% by weight of the non-volatile components.

3. The coating composition of claim 1 containing a plasticizer.

4. The coating composition of claim 1, in which the polymer of methyl methacrylate is a homopolymer.

5. The coating composition of claim 1, in which the polymer of methyl methacrylate is a copolymer of methyl methacrylate and a minor proportion of other material copolymerizable therewith.

6. The coating composition of claim 1, in which the polymer of methyl methacrylate is a copolymer of methyl methacrylate and a minor proportion of a member of the group consisting of acrylic acid, methacrylic acid, the 1–4 carbon atom alkyl esters of acrylic acid, the 2–4 carbon atom alkyl esters of methacrylic acid, vinyl acetate, acrylonitrile and styrene.

7. The coating composition of claim 1, in which the polymer of methyl methacrylate is a copolymer of methyl methacrylate and a minor proportion of methacrylic acid.

8. The coating composition of claim 1, in which the polymer of methyl methacrylate is a mixture of a homopolymer of methyl methacrylate and a copolymer of methyl methacrylate and a minor proportion of another material copolymerizable therewith.

9. A coated article having a hard, adherent, durable, non-tarnishing top coat of the dried coating composition of claim 1.

10. A non-gelling liquid coating composition which on drying yields a durable non-tarnishing film, comprising a polymer of methyl methacrylate, solvent therefor, transparent colored pigment, and 0.5–35% of copper bronze flake pigment, and 1–50% of organophillic cation-modified clay, the pigment and clay being based on the total weight of the non-volatile components, said cation being an onium radical of the class consisting of ammonium, phosphonium, oxonium, sulfonium, selenonium, stannonium, arsonium, stibonium, telluronium and iodonium, and having at least one alkyl substituent containing at least 10 carbon atoms in a straight chain.

11. The coating composition of claim 10, in which the onium radical is ammonium.

12. The coating composition of claim 10, in which the onium radical is ammonium and the clay is a bentonite.

13. The coating composition of claim 10, in which the clay is a dimethyldioctadecyl ammonium salt of bentonite.

14. The coating composition of claim 10, in which the polymer of methyl methacrylate is a homopolymer.

15. The coating composition of claim 10, in which the polymer of methyl methacrylate is a copolymer of methyl methacrylate and a minor proportion of other material copolymerizable therewith.

16. The coating composition of claim 10, in which the polymer of methyl methacrylate has a molecular weight of 55,000–105,000.

References Cited in the file of this patent

UNITED STATES PATENTS

| | | |
|---|---|---|
| 1,980,483 | Hill | Nov. 13, 1934 |
| 2,063,078 | Barrett | Dec. 8, 1936 |
| 2,078,808 | Reardon | Apr. 27, 1937 |
| 2,204,517 | Strain | June 11, 1940 |
| 2,731,436 | Stetz | Jan. 17, 1956 |
| 2,892,804 | Crissey | June 30, 1959 |

FOREIGN PATENTS

| | | |
|---|---|---|
| 709,952 | Great Britain | June 2, 1954 |

OTHER REFERENCES

"Synthetic Resins and Rubbers," by Powers, published 1943 by John Wiley and Sons, pages 155–156.

UNITED STATES PATENT OFFICE
CERTIFICATE OF CORRECTION

Patent No. 2,934,512                        April 26, 1960

Henry W. Godshalk

It is hereby certified that error appears in the printed specification of the above numbered patent requiring correction and that the said Letters Patent should read as corrected below.

Column 5, line 5, after "blue pigment." insert the following as a new paragraph –

> Other copper bronze flake pigments or mixtures thereof may be substituted in the examples in the same amount or in different amounts within the range of 0.5-35% by weight of the total non-volatile ingredients. Below about 0.5%, while the effect of the bronze pigment is visible under close examination, it does not contribute materially to the color or the appearance of the products. Above about 35%, there is no additional advantage in color or other properties of the compositions. The preferred amount of copper bronze flake pigment is about 0.75-15% by weight of the total non-volatile constituents.

Signed and sealed this 20th day of September 1960.

(SEAL)

Attest:

KARL H. AXLINE                                  ROBERT C. WATSON
Attesting Officer                                 Commissioner of Patents